(12) United States Patent
Fischer et al.

(10) Patent No.: US 11,535,185 B2
(45) Date of Patent: Dec. 27, 2022

(54) ROOF-MOUNTED OCCUPANT RESTRAINT SYSTEM

(71) Applicant: ZF Passive Safety Systems US Inc., Washington, MI (US)

(72) Inventors: Kurt F. Fischer, Rochester, MI (US); Alexandra E. Smith, Richmond, MI (US); Douglas M. Gould, Lake Orion, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 16/975,172

(22) PCT Filed: Dec. 3, 2018

(86) PCT No.: PCT/US2018/063547
§ 371 (c)(1),
(2) Date: Aug. 24, 2020

(87) PCT Pub. No.: WO2019/168578
PCT Pub. Date: Sep. 6, 2019

(65) Prior Publication Data
US 2021/0114547 A1 Apr. 22, 2021

Related U.S. Application Data

(60) Provisional application No. 62/666,771, filed on May 4, 2018, provisional application No. 62/661,667, filed
(Continued)

(51) Int. Cl.
*B60R 21/214* (2011.01)
*B60R 21/2338* (2011.01)
(Continued)

(52) U.S. Cl.
CPC .......... *B60R 21/214* (2013.01); *B60R 21/231* (2013.01); *B60R 21/233* (2013.01);
(Continued)

(58) Field of Classification Search
CPC . B60R 21/214; B60R 21/233; B60R 21/2338; B60R 21/26; B60R 21/232;
(Continued)

(56) References Cited

U.S. PATENT DOCUMENTS 5,772,238 A 6/1998 Breed et al.
6,966,579 B2 11/2005 Schneider et al.
(Continued)

FOREIGN PATENT DOCUMENTS

DE 102009033022 A1 * 3/2011 ........... B60R 21/232

*Primary Examiner* — Keith J Frisby
(74) *Attorney, Agent, or Firm* — Tarolli, Sundheim, Covell & Tummino LLP

(57) ABSTRACT

A restraint system (10) for helping to protect an occupant (60) of a vehicle (20) having a roof (32) and a cabin (40) with a seat (50) for the occupant (60) includes an airbag (120) having a stored condition within the roof (32) and being inflatable to a deployed condition extending into the cabin (40) aligned with the seat (50). A tether (140) includes a first end (142) connected to the airbag (120) and a second end (144) connected to the vehicle (20). Tear stitching (170) interconnects overlying portions (152, 154) of the tether (140). The tear stitching (170) is rupturable in response to occupant (60) penetration into the deployed airbag (120) to permit the interconnected overlying portions (151, 154) to move relative to one another such that the tether (140) lengthens.

24 Claims, 8 Drawing Sheets

Related U.S. Application Data on Apr. 24, 2018, provisional application No. 62/636,899, filed on Mar. 1, 2018.

(51) Int. Cl.

| | |
|---|---|
| *B60R 21/232* | (2011.01) |
| *B60R 21/231* | (2011.01) |
| *B60R 21/233* | (2006.01) |
| *B60R 21/26* | (2011.01) |
| *B60R 21/239* | (2006.01) |
| *B60R 21/237* | (2006.01) |
| *B60R 21/2342* | (2011.01) |
| *B60R 21/00* | (2006.01) |

(52) U.S. Cl.
CPC ........ *B60R 21/239* (2013.01); *B60R 21/2338* (2013.01); *B60R 21/26* (2013.01); *B60R 21/232* (2013.01); *B60R 21/237* (2013.01); *B60R 21/2342* (2013.01); *B60R 2021/0004* (2013.01); *B60R 2021/23153* (2013.01); *B60R 2021/23192* (2013.01); *B60R 2021/23308* (2013.01); *B60R 2021/23316* (2013.01); *B60R 2021/23324* (2013.01); *B60R 2021/23386* (2013.01); *B60R 2021/26058* (2013.01)

(58) Field of Classification Search
CPC ................ B60R 21/231; B60R 21/213; B60R 2021/23192; B60R 2021/23153; B60R 2021/23324; B60R 2021/23386; B60R 2021/23161; B60R 2021/0004; B60R 2021/23308; B60R 2021/23316; B60R 2021/23332; B60R 2021/0048; B60R 2021/26058
USPC .................................. 280/729, 730.1, 743.2
See application file for complete search history.

(56) References Cited

U.S. PATENT DOCUMENTS

| | | |
|---|---|---|
| 8,262,130 B2 | 9/2012 | Fischer et al. |
| 8,544,883 B2 | 10/2013 | Fischer et al. |
| 8,764,058 B2 | 7/2014 | Fischer et al. |
| 9,174,603 B2 | 11/2015 | Fischer et al. |
| 9,533,650 B2 | 1/2017 | Le Norcy et al. |
| 9,676,361 B2 | 6/2017 | Smith et al. |
| 2005/0001412 A1 | 1/2005 | Schneider et al. |
| 2006/0163848 A1 | 7/2006 | Abe |
| 2012/0267883 A1 | 10/2012 | Fischer et al. |
| 2015/0283971 A1 | 10/2015 | Fischer et al. |
| 2016/0167613 A1 | 6/2016 | Farooq et al. |

\* cited by examiner

ROOF-MOUNTED OCCUPANT RESTRAINT SYSTEM

CROSS REFERENCE TO RELATED APPLICATIONS

This application is a national stage of International Application No. PCT/US2018/063547, filed Dec. 3, 2018, which claims benefit of U.S. Provisional Appln. Nos. 62/636,899, filed Mar. 1, 2018; 62/661,667, filed Apr. 24, 2018; and 62/666,771, filed May 4, 2018. The disclosures of these applications are incorporated herein by reference in their entireties.

TECHNICAL FIELD

The present invention relates generally to vehicle airbags and, in particular, relates to a roof-mounted airbag having a tether.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surfaces.

SUMMARY

In one example, a restraint system for helping to protect an occupant of a vehicle having a roof and a cabin with a seat for the occupant includes an airbag having a stored condition within the roof and being inflatable to a deployed condition extending into the cabin aligned with the seat. A tether includes a first end connected to the airbag and a second end connected to the vehicle. Tear stitching interconnects overlying portions of the tether. The tear stitching is rupturable in response to occupant penetration into the deployed airbag to permit the interconnected overlying portions to move relative to one another such that the tether lengthens.

In another example, a restraint system for helping to protect an occupant of a vehicle having a roof and a cabin with a row of seats includes an airbag having a stored condition within the roof. The airbag is inflatable to a deployed condition extending into the cabin and parallel to the row of seats. A one-piece tether has a first end connected to a lower portion of the airbag and a second end connected to the roof. Tear stitching interconnects overlying portions of the tether. The tear stitching is rupturable in response to occupant penetration into the deployed airbag to permit the interconnected overlying portions to move relative to one another such that the tether lengthens from a first length prior to occupant penetration to a second, longer length in response to occupant penetration.

Other objects and advantages and a fuller understanding of the invention will be had from the following detailed description and the accompanying drawings.

DETAILED DESCRIPTION

Figure 1:
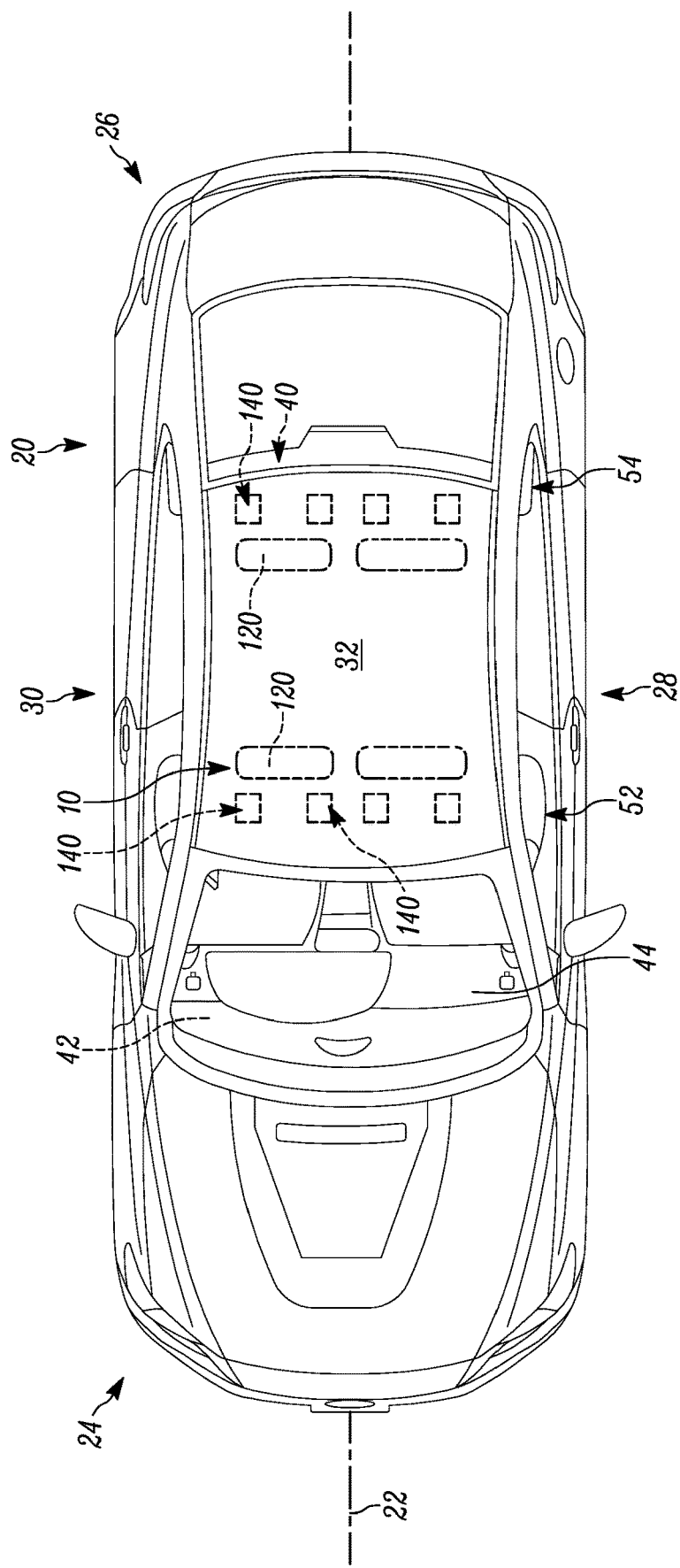
FIG. 1 is a top view of a vehicle including a roof-mounted, occupant restraint system in accordance with the present invention.
Figure 2:
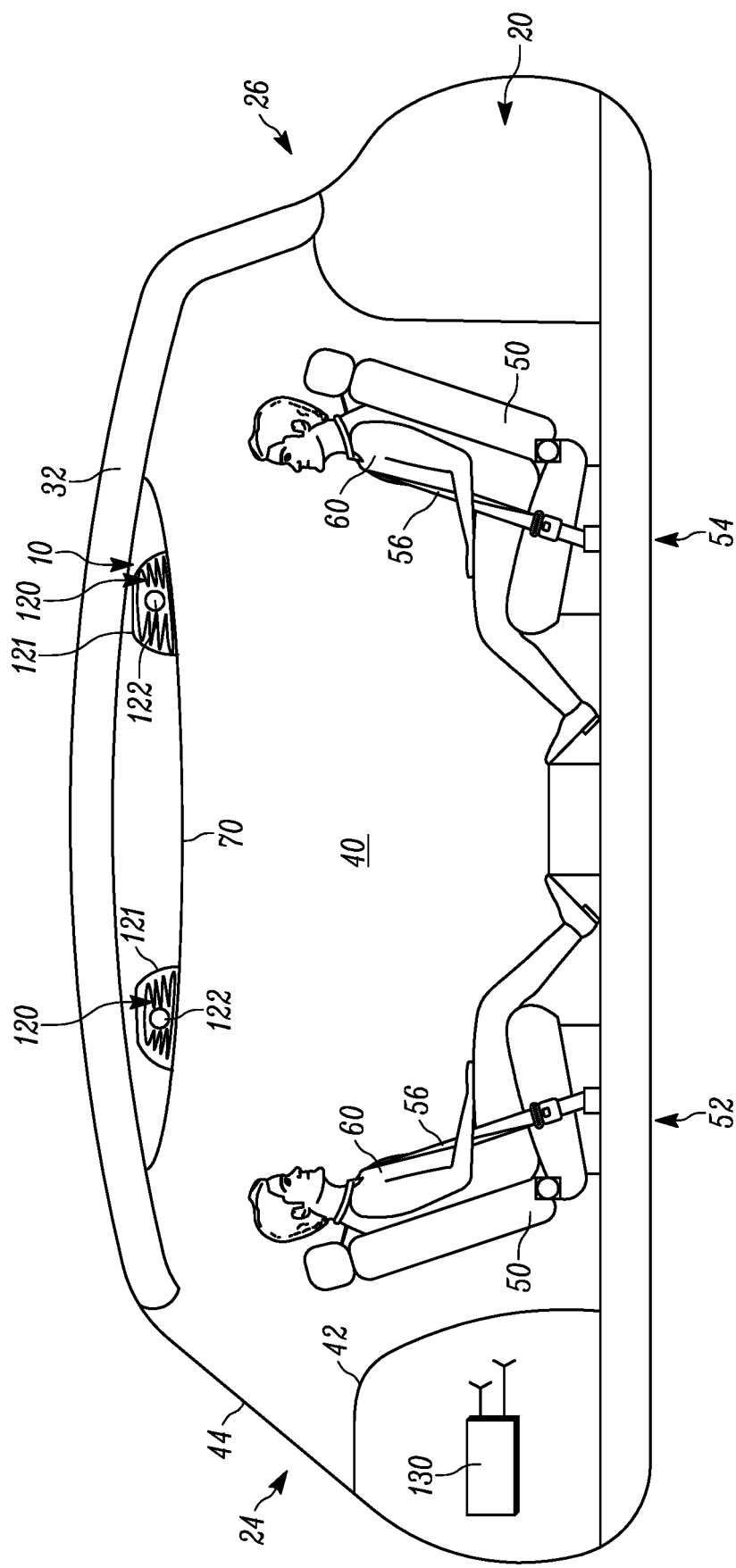
FIG. 2 is a schematic illustration of a cabin of the vehicle with an airbag of the restraint system in a stored condition.

The present invention relates generally to vehicle airbags and, in particular, relates to a roof-mounted airbag having a tether. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, facing each other, with the front row facing rearward toward the rear row. Alternatively, the front and rear rows 52 and 54 can both be arranged in a forward-facing manner (not shown), similar to that of conventional automobiles. In either case, each seat 50 is fitted with a seatbelt 56 for restraining its occupant 60. Control interfaces for climate controls, GPS, navigation, entertainment, etc. can, for example, be provided in a center console area of the vehicle 20 located between the occupants 60 of the front and/or rear rows 52, 54.

For the unconventional, forward-rearward seating arrangement of FIG. 2, in the event of a frontal crash, the occupants 60 of the forward-facing rear row 54 are restrained by their respective seatbelts 56. Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Since the front row 52 need not face forward and need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

With this in mind, the occupant restraint system 10 shown in FIGS. 1-2 includes at least one vehicle occupant protection device in the form of an inflatable curtain airbag 120 mounted in the roof 32 of the vehicle 20. Mounting the airbags 120 in the vehicle roof 32 is convenient because the airbags can be positioned in a location with a desired proximity to the occupant(s) 60 they are intended to help protect. This can help reduce the necessary inflatable volume of the airbags 120 and can also help provide a desired airbag deployment time without requiring an excessively high-volume inflator.

The airbags 120 are housed/concealed in the roof structure of the vehicle 20 behind, for example, a roof liner 70. The airbag 120 is at least one of rolled and folded before being placed behind the roof liner 70. The rolled airbag 120 can be provided in a cover or housing 121 that is then placed behind the roof liner 70. The occupant restraint system 10 also includes an inflator 122 within the housing 121 for providing inflation fluid to each airbag 120. The inflators 122 are operatively connected (e.g., by wires) to an airbag controller 130 (see FIG. 2) that includes or communicates with one or more crash sensors (not shown). The controller 130 is operative to determine the occurrence of a crash event and to actuate at least one inflator 122 in a known manner to inflate at least one airbag 120. The inflators 122 can be of any known type, such as stored gas, solid propellant, augmented or hybrid.

The airbag 120 can be constructed of any suitable material, such as nylon (e.g., woven nylon 6-6 yarns), and may be constructed in any suitable manner. For example, the airbag 120 may include one or more pieces or panels of material. If more than one piece or panel is used, the pieces or panels can be interconnected by known means, such as stitching, ultrasonic welding, heat bonding, or adhesives, to form the airbag 120. The airbag 120 can be uncoated, coated with a material, such as a gas impermeable urethane, or laminated with a material, such as a gas impermeable film. The airbag 120 can therefore have a gas-tight or substantially gas-tight construction. Those skilled in the art will appreciate that alternative materials, such as polyester yarn, and alternatives coatings, such as silicone, may also be used to construct the airbag 120.

The occupant restraint system 10 can include multiple airbags 120 provided along the roof 32 and within the roof liner 70 at locations associated and aligned with each seat 50 in each row 52, 54. In other words, each seat 50 in the vehicle 20 can have an individual airbag 120 (and corresponding inflator 122) associated and aligned therewith. In each case, the airbag 120 is positioned in front of the associated seat 50 in each row 52, 54 in the direction the occupants 60 in those seats would face (i.e., rearward of the front row 52 and forward of the rear row 54). The airbags 120 extend in the left-to-right direction of the vehicle 20 and generally parallel to the width of the seats 50. Alternatively, a single airbag 120 can span the entire width of the cabin 40 to protect all the occupants 60 in an entire row 52 or 54 (not shown). In the example shown in FIG. 2, airbags 70 are provided behind the roof liner 70 and associated with a seat 50 in each row 52, 54. Although the airbags 120 are identical, the construction and operation of only the airbag associated with the seat 50 in the rear row 54 is discussed for brevity.

Figure 3:
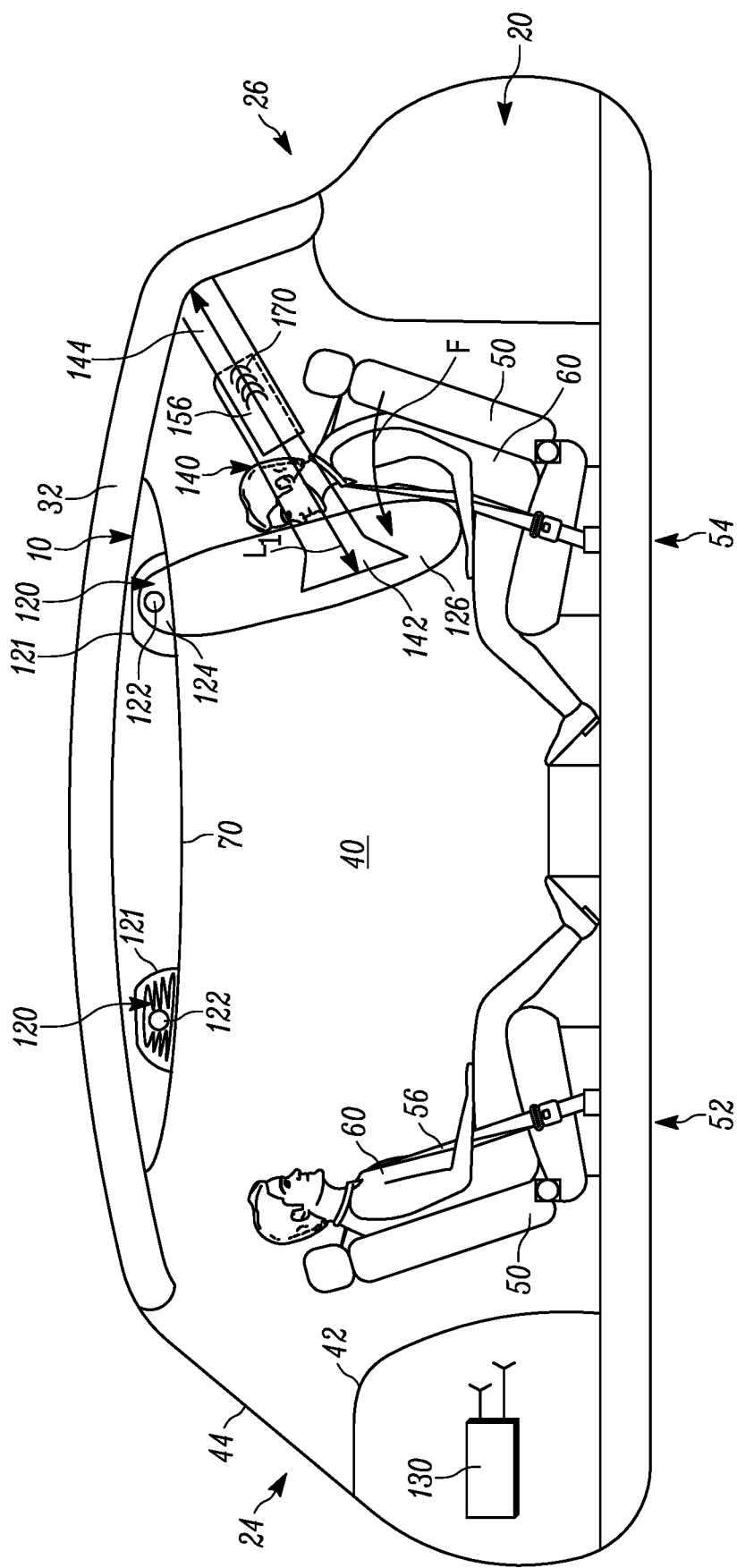
FIG. 3 is a schematic illustration of the cabin of the vehicle with the airbag in a deployed condition.

As shown in FIG. 3, upon sensing the occurrence of an event for which inflation of the airbag 120 is desired, such as a vehicle collision, the controller 130 provides signals to the inflator 122. Upon receiving the signals from the controller 130, the inflator 122 is actuated and provides inflation fluid to the inflatable volume of the airbag 120 in a known manner. The inflating airbag 120 exerts a force on the roof liner 70, which causes the roof liner to open. This releases the airbag 120 to inflate and deploy from its stored condition behind the roof liner 70 to a deployed condition extending into the cabin 40 forward of and aligned with a seat 50 in the rear row 54. The airbag 120, while inflated, helps protect the vehicle occupant 60 in the rear row 54 by absorbing the impact of the occupant.

The inflated airbag 120 extends from an upper portion 124 to a lower portion 126. The upper portion 124 is connected to the vehicle 20 and fluidly connected to the inflator 122. The lower portion 126 is positioned adjacent the occupant 60 in the seat 50 in the rear row 54. As noted, there is no vehicle structure in position to act as a reaction surface to constrain movement of the deployed airbag 120. Consequently, the occupant restraint system 10 can include one or more tethers 140 associated with each airbag 120 and extending from each airbag to locations adjacent to or at the roof 32. Each tether 140 is formed from a single piece of inextensible material and extends from a first end 142 connected to the lower portion 126 of the airbag 120 and a second end 144 connected to the roof 32. The first end 142 can be formed as a stress reducer for spreading the connection between the tether 140 and the airbag 120 over a larger surface area of the airbag fabric so as to prevent tearing.

As shown in FIG. 1, two tethers 140 are connected to the roof 32 on opposite sides of the airbag 120, namely, the inboard and outboard sides of each airbag. The tethers 140 are connected to the roof 32 at locations rearward of the occupant-facing surface of the airbag 120. Because the occupant 60 is belted, a frontal crash resulting in forward occupant movement causes the occupant to bend at the waist and follow an angled or arcuate path toward the airbag 120, as indicated generally by the arrow F in FIG. 3. Advantageously, as shown in FIG. 3, the location of the second end 144/roof 32 connection can be selected such that the tethers 140 extend in a direction or along a path that approximates or coincides with (i.e., lies substantially parallel to or coextensive with) the path along which the occupant 60 travels into contact with the airbag 120.

In this manner, the tension the tethers 140 apply to the airbag 120 can be opposite the impact forces applied to the airbag by the penetrating occupants 60. As a result, the roof 32, through the tethers 140, acts as the reaction surface for the airbag 120. The example configuration of FIG. 3 therefore requires no interaction with forward structure of the vehicle 20, such as an instrument panel, steering wheel, or seat, to provide a reaction surface for the airbag.

Figure 4A:
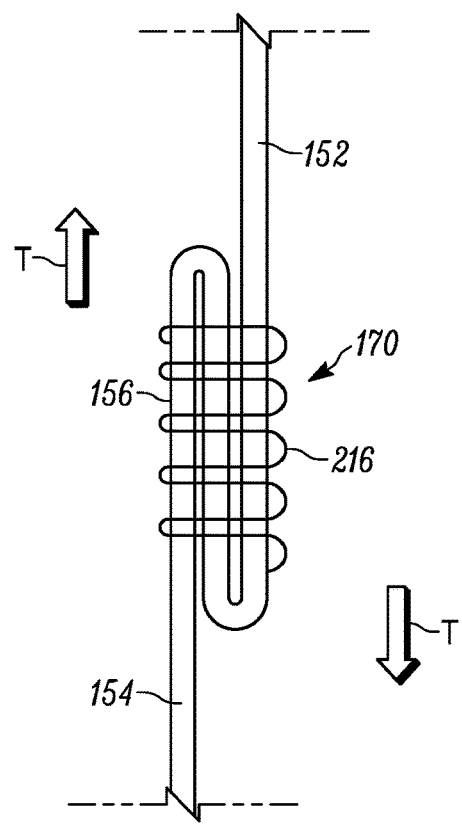
FIG. 4A is a side view of a tether of the restraint system of FIG. 1.

The tethers 140 are configured to provide a ride-down effect on the penetrating occupant 60 by gradually dissipating the impact force on the occupant by the airbag 120. In one example shown in FIGS. 4A-4B, first and second portions 152, 154 of the tether material are positioned over one another in an adjacent and overlying manner to form a folded portion 156 between the ends 142, 144. Tear stitching 216 extends through the overlaid portions 152, 154 and can be constructed using conventional sewing techniques. The tear stitching 216 is configured to rupture in response to tension T applied to the first and second portions 152, 154 of material.

The tear stitching 216 is formed from segments 180 each having a start point 176 and an end point 178. A break point 182 is located between (e.g., at the midpoint between) the start point 176 and end point 178 of each segment 180. The break point 182 is positioned at the point along the tear stitching 216 where it is intended that the tear stitching ruptures under tension T. It will be appreciated that the tear stitching 216 can include a single segment 180 (not shown).

Figure 4B:
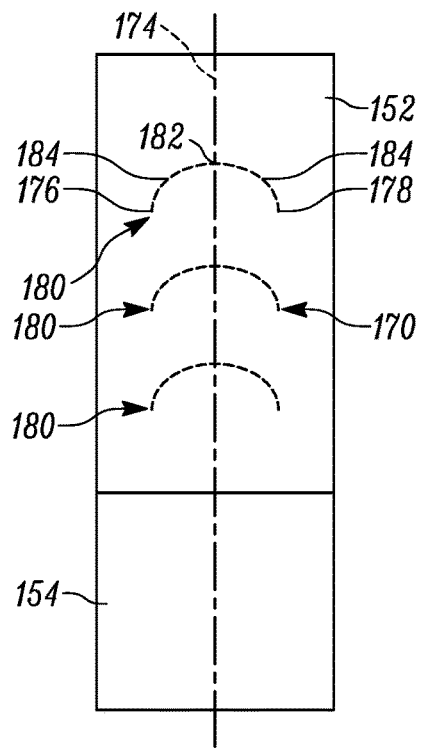
FIG. 4B is a front view of the tether of FIG. 4A.

As viewed in FIG. 4B, each segment 180 has an inverted, generally curved U-shaped configuration with outwardly diverging curved segments or legs 184 that meet at the break point 182. The segments 180 are arranged such that an axis of symmetry 174 of the tear stitching 216 intersects the break points 182 and bisects the legs 184. The axis 174 extends generally parallel to the directions of tension T.

The first and second portions 152, 154 of material are arranged such that the tension T applied to the portions results in a peeling action or motion between the portions, which acts on the tear stitching 216. In the example illustrated in FIGS. 4A-4B, this peeling action is produced by the repeated folding of the one-piece tether 140 and extending the tear stitching 216 therethrough. When the tension T is applied, the resulting peeling action helps focus the tension on the break points 182 of the tear stitching 216. Other examples of rupturable tear stitching that can be used to secure the first and second portions 152, 154 of material are shown and described in U.S. Pat. Nos. 8,262,130, 8,764,058, and 9,174,603, the entirety of which are incorporated by reference herein.

Referring back to FIG. 3, after the airbag 120 is deployed but prior to occupant penetration (FIG. 3), the deployed airbag fully tensions the tethers 140 but the tear stitching 216 remains intact. The tethers 140 maintain the lower portion 126 of the airbag 120 in the position shown. The tether 140 has an initial length L1 when the tear stitching 216 is intact and extends through the portions 152, 154, thereby forming the folded portion 156. The tear stitching 216 is configured to rupture in response to forces exerted on the tear stitching when the occupant 60 in the rear row 54 moves forward in the cabin 40 in the manner F in response to a vehicle crash. The moving occupant 60 impacts and penetrates the inflated and deployed airbag 120, which exerts tension T on the tear stitching 216 until the tear stitching ruptures at the break points 182.

Figure 5:
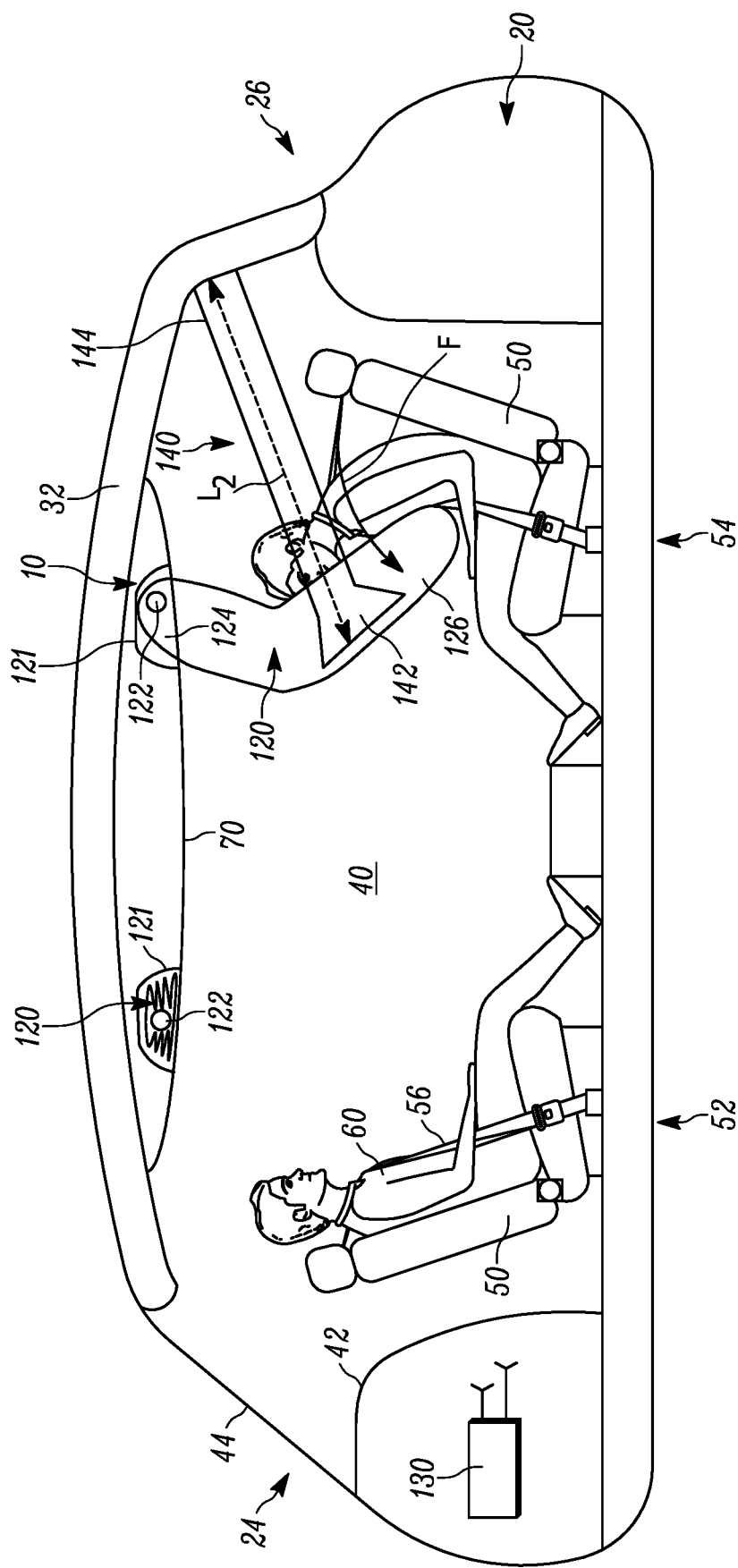
FIG. 5 is a schematic illustration of the restraint system of FIG. 1 following occupant penetration into the airbag.

The ruptured tear stitching 216 allows the portions 152, 154 of material to move relative to one another, thereby enabling the tether 140 to unfurl at the folded portion 156 and lengthen to a length $L_2$ greater than the length $L_1$ as shown in FIG. 5. As a result, the inflated airbag 120 moves with the forward moving occupant 60. The second end 144 of the tether 140, however, is still connected to the vehicle roof 32 and limits movement of the airbag 120 in the direction F. More specifically, the extended tether 140 holds the lower portion 126 of the airbag 120 to prevent swinging/pivoting of the airbag about the inflator 122 when the airbag is penetrated by the occupant 60.

Due to this configuration, the tear stitching 216 allows the occupant 60 to ride down the airbag 120 and experience a more gradual reaction with the airbag while the tethers 140 provide a reaction surface for the deployed, moving airbag.

In other words, the tear stitching 216 allows for a gradual slowdown of the penetrating occupant 60 into the airbag 120 in a prescribed manner.

Figure 6:
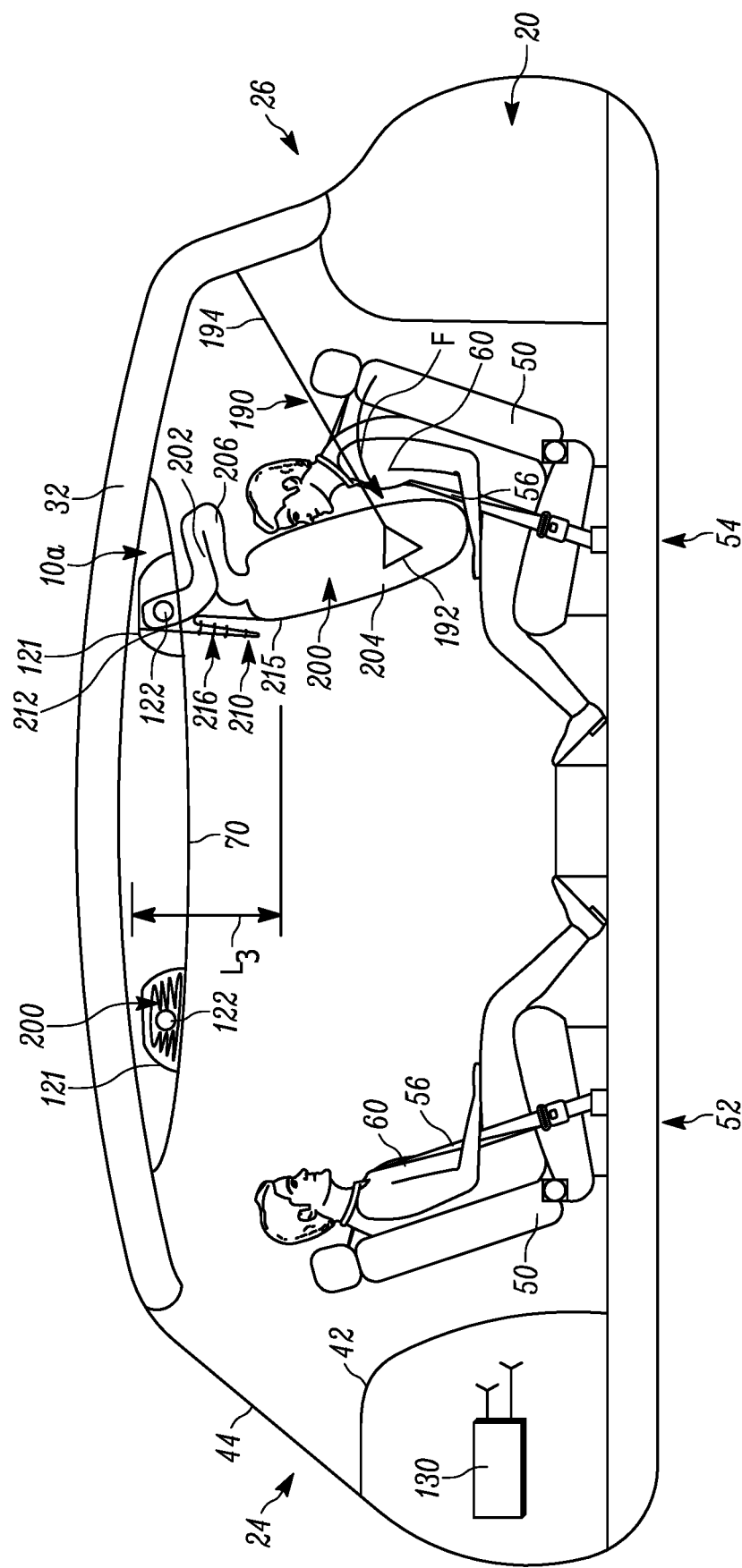
FIG. 6 is a schematic illustration of another example restraint system with the airbag in a deployed condition.
Figure 7A:
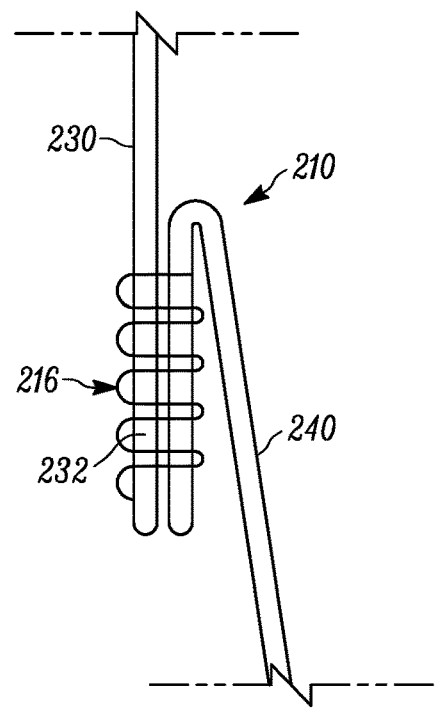
FIG. 7A is a side view of the tether of the restraint system of FIG. 6.
Figure 7B:
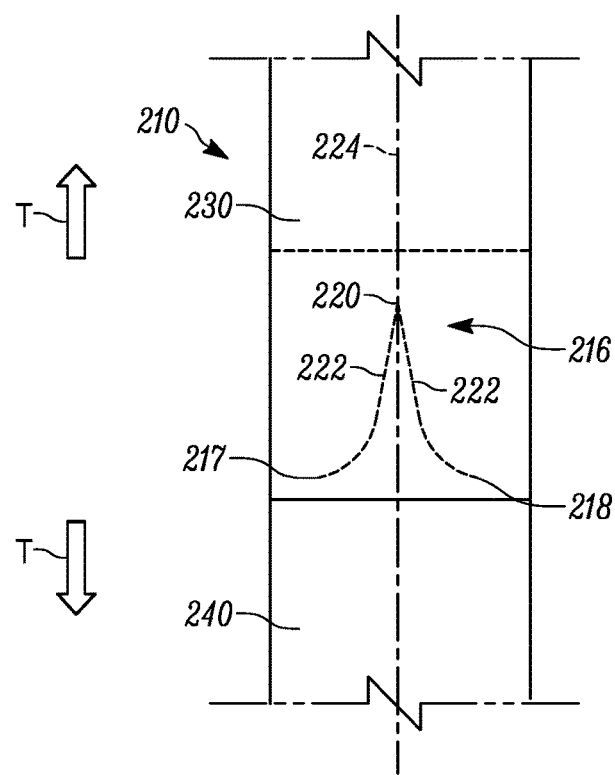
FIG. 7B is a front view of the tether of FIG. 7A.
Figure 8:
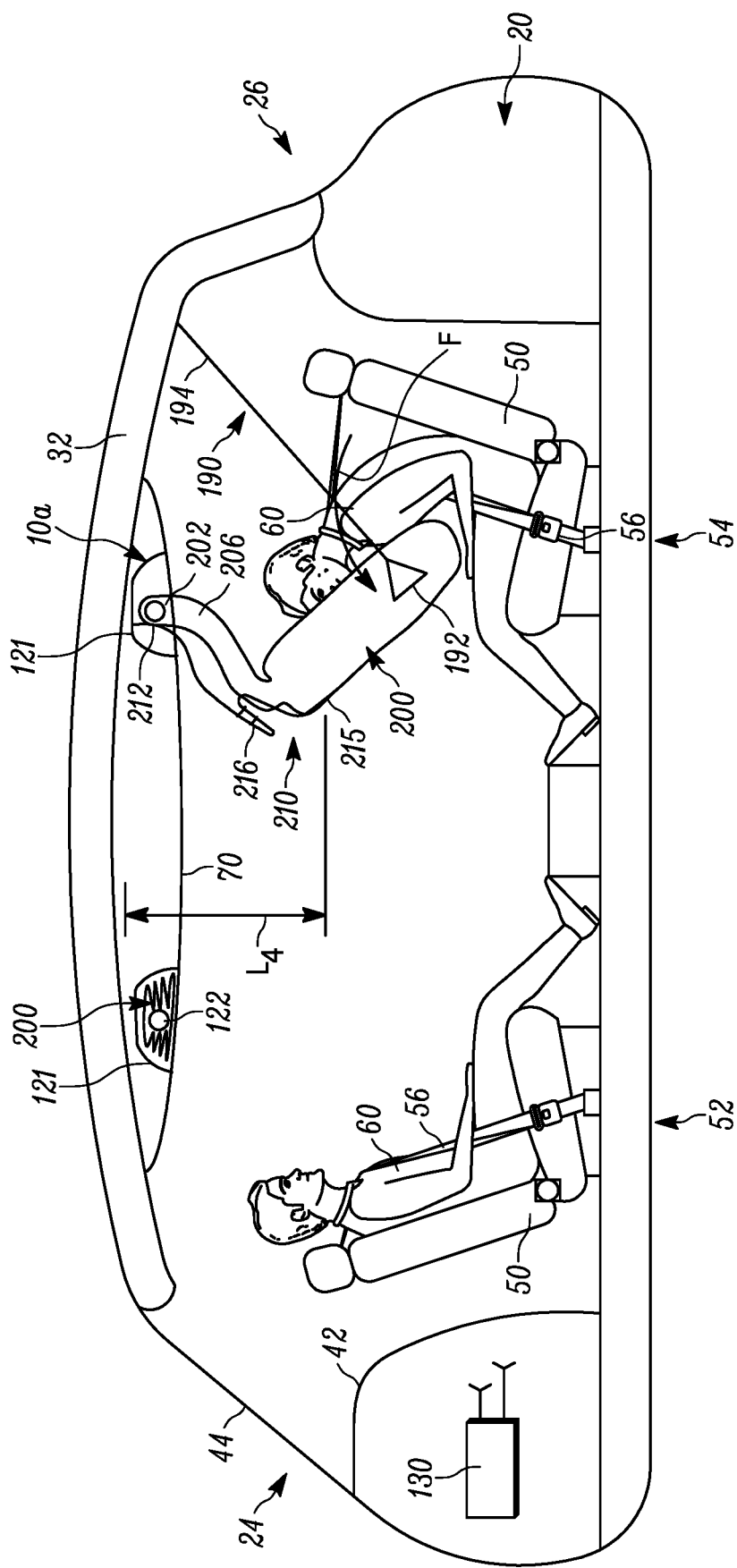
FIG. 8 is a schematic illustration of the restraint system of FIG. 6 following occupant penetration into the airbag.

FIGS. 6-8 illustrate another example restraint system 10a including the inflator(s) 122 and an airbag 200 associated with each inflator. The inflated airbag 200 in FIG. 6 extends from an upper portion 202 to a lower portion 204. The upper portion 202 is connected to the vehicle 20 and fluidly connected to the inflator 122. The lower portion 204 is positioned adjacent the occupant 60 in the seat 50 of the rear row 54. The upper portion 202 includes a neck 206 that is folded over itself and therefore contracted when the airbag 200 is deployed but prior to penetration of the occupant 60 into the airbag.

The system 10a includes tethers 190, 210 connected to the airbag 200 that cooperate to provide a ride-down effect on the penetrating occupant 60 by gradually dissipating the impact force on the occupant by the airbag. The first tethers 190 extend from each airbag 200 to locations adjacent to or at the roof 32. Each tether 190 is formed from a single piece of inextensible material and extends from a first end 192 connected to the lower portion 204 of the airbag 200 and a second end 194 connected to the roof 32. The first end 192 can be formed as a stress reducer for spreading the connection between the tether 190 and the airbag 200 over a larger surface area of the airbag fabric so as to prevent tearing. Similar to the tethers 140, two tethers 190 are connected to the roof 32 on opposite sides of the airbag 200, namely, the inboard and outboard sides of each airbag.

The second tether 210 includes a first end 212 connected to the vehicle 20 behind and/or at the roof liner 70. A second end 215 of tether 210 is connected to the airbag 200. The second tether 210 is formed from two separate pieces 230, 240 of material defining separate portions.

Referring to FIGS. 7A-7B, the first and second portions 230, 240 of the second tether 210 are positioned over one another in an adjacent and overlying manner. Alternatively, the tether 210 could be formed from a single piece of material including the portions 230, 240 and folded over itself similar to the tether 140 (not shown). In any case, tear stitching 216 extends through the overlaid portions 230, 240 and can be constructed using conventional sewing techniques. The tear stitching 216 is configured to rupture in response to tension T applied to the first and second portions 230, 240 of material. The tear stitching 216 is formed from a single segment having a start point 217 and an end point 218. A break point 220 is located between (e.g., at the midpoint between) the start point 217 and end point 218. The break point 220 is positioned at the point along the tear stitching 216 where it is intended that the tear stitching rupture under tension T. It will be appreciated that the tear stitching 216 can alternatively be formed from multiple, identical segments (not shown) similar to the tear stitching 216 in FIGS. 4A-4B.

As viewed in FIG. 7B, the tear stitching 216 has an inverted, generally curved V-shaped configuration with outwardly diverging curved segments or legs 222 that meet at the break point 220. The tear stitching 216 is arranged such that an axis 224 of symmetry of the tear stitching 216 intersects the break point 220 and bisects the legs 222. The axis 224 extends generally parallel to the directions of tension T.

The first and second portions 230, 240 of material are arranged such that the tension T applied to the portions results in a peeling action or motion between the portions, which acts on the tear stitching 216. In the example illustrated in FIGS. 7A-7B, this peeling action is produced by folding the second portion 240 over itself and overlaying the folded second portion onto the first portion 230 so as to extend parallel therewith. The tear stitching 216 then extends through the first portion 230 and the folded portion of the second portion 240. Consequently, when the tension T is applied, the resulting peeling action helps focus the tension on the break point 220 of the tear stitching 216.

Referring back to FIG. 6, the second tether 210 has an initial length $L_3$ when the tear stitching 216 is intact. As a result, the neck 206 remains folded and contracted. The tethers 190 are fully extended at this point and hold the lower portion 204 of the airbag 200 in place. The tear stitching 216 is configured to rupture in response to forces exerted on the tear stitching when the occupant 60 in the rear row 54 moves forward in the cabin 40 in the manner F in response to a vehicle crash. The moving occupant 60 impacts and penetrates the inflated and deployed airbag 200, which exerts tension T on the tear stitching 216 until the tear stitching ruptures at the break point 220.

The ruptured tear stitching 216 allows the portions 230, 240 of material to move relative to one another, thereby enabling the second tether 210 to unfurl and lengthen to a length $L_4$ greater than the length $L_3$ (see FIG. 8). As a result, the inflated airbag 200 moves with the forward moving occupants 60. The ends 192, 194 of the first tethers 190, however, remain secured to the lower portion 204 of the airbag 200 and the roof 32, respectively.

It will be appreciated that the tear stitching 216 shown in FIG. 7 does not rupture completely and, thus, the first and second portions 230, 240 remain secured together by the intact tear stitching. Since the ends 212, 215 of the second tether 210 remain secured to the airbag 200 and the vehicle 20 the second tether also provides a reaction force on the moving airbag 200 in addition to the reaction force provided by the first tether 190. The tethers 190, 210 can therefore cooperate to limit movement of the airbag 200 in the direction F. Consequently, the tear stitching 216 allows the occupant 60 to ride down the airbag 200 and experience a more gradual reaction with the airbag while the tethers 190, 210 provide a reaction surface for the deployed, moving airbag.

It will be appreciated that the tear stitching 216 can be configured to rupture completely, in which case the first and second portions 230, 240 would become separated (not shown) and the second tether 210 would not provide additional reaction force to the moving airbag 200. In such a case, only the first tether 190 would provide the reaction force.

It will be also be appreciated that the lower portion 204 of the airbag 200 could alternatively deploy into engagement with the occupant's 60 lap or lower torso, in which case the tethers 190 would be omitted (not shown). In other words, the airbag 200 could be sized to deploy downwards into engagement with the occupant 60 such that the occupant—not the tethers 190—fixes the lower portion 204 of the airbag 200 in place to enable the tear stitching 216 to rupture and the second tether 210 to unfurl in response to occupant penetration into the lower portion 204.

Although the descriptions of the airbags and tethers above is directed to the rear row 54 of seats 50, it will be appreciated that the same airbags and tethers can be provided for the front row 52 of the seats (see FIGS. 1-2). Since the seats 50 in the rows 52, 54 face in opposite directions, the purposes of their respective airbags 120 or 200 differ from each other. In the event of a frontal vehicle crash, the rearward-facing seats 50 in the front row 52 will help protect their occupants 60 by absorbing the impact of the occupants.

The airbags 120 or 200 of the forward-facing rear seats 50 in the rear row 54 will help protect their occupants 60 by absorbing the impact energy of the occupants. In the event of a rear vehicle crash, the seatbacks of the forward-facing seats 50 in the rear row 54 will help protect their occupants 60 by absorbing the impact with the occupants. The airbags 120 or 200 of the rearward-facing seats 50 in the front row 52 will help protect their occupants 60 by absorbing the impact energy of the occupants.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A restraint system for helping to protect an occupant of a vehicle having a roof and a cabin with a seat for the occupant, comprising:
   an airbag having a stored condition within the roof and being inflatable to a deployed condition extending into the cabin and aligned with the seat;
   a tether having a first end connected to the airbag and a second end connected to the vehicle roof; and
   tear stitching interconnecting overlying portions of the tether, the tear stitching being rupturable in response to occupant penetration into the deployed airbag to permit the interconnected overlying portions to move relative to one another such that the tether lengthens, wherein the tear stitching is configured to rupture gradually in response to occupant penetration so that the lengthening of the tether due to rupturing of the tear seam is commensurate with the magnitude of forces exerted by the penetrating occupant so as to provide a gradual ride down for the penetrating occupant, and wherein the tether is connected to an upper portion of the airbag and wherein a lower portion of the airbag is configured to deploy into engagement with at least one of a lower torso and lap of the occupant so that the occupant fixes the lower portion of the airbag in place, allowing the tear stitching to rupture and the tether to unfurl in response to occupant penetration.

2. The system recited in claim 1, wherein the tether is formed as one piece and the interconnected portions comprise a folded over portion of the one-piece tether.

3. The system recited in claim 2, wherein the tear stitching is completely ruptured in response to occupant penetration into the airbag.

4. The system recited in claim 2, wherein the tear stitching is partially ruptured in response to occupant penetration into the airbag such that the interconnected portions of tether material become separated from one another.

5. The system recited in claim 1, wherein the interconnected portions are separate pieces of material of the tether.

6. The system recited in claim 1 further comprising a second tether connected to the airbag and the vehicle and being free of tear stitching.

7. The system recited in claim 6, wherein the second tether is connected to the lower portion of the airbag and the roof.

8. The system recited in claim 1, wherein the tether is connected to the lower portion of the airbag and the roof.

9. The system recited in claim 1, wherein the tear stitching has an inverted U-shaped configuration.

10. The system recited in claim 1, wherein the tear stitching has an inverted V-shaped configuration.

11. The system recited in claim 1, wherein the upper portion of the airbag includes a neck having a folded condition when the tear stitching is intact and an unfurled condition when the tear stitching ruptures.

12. The system recited in claim 1, wherein the tear stitching is configured so that its rupture provides a gradual slowdown of the penetrating occupant.

13. The system recited in claim 1, wherein the tear stitching comprises multiple segments configured to rupture individually and increase the length of the tether in response to occupant penetration into the airbag.

14. The system recited in claim 13, wherein the increasing length of the tether in response to rupture of the segments provides a gradual slowdown of the penetrating occupant.

15. The system recited in claim 1, wherein the tether is a first tether and wherein the system further comprises a second tether having a first portion connected to the roof and a second portion connected to a lower end of the lower portion of the airbag, wherein the second tether is configured to restrain the lower end of the lower portion of the airbag against the penetrating occupant while the lengthening of the first tether in response to rupture of the tear stitching allows the remainder of the lower portion to move in response to occupant penetration into the airbag.

16. A restraint system for helping to protect an occupant of a vehicle having a roof and a cabin with a seat for the occupant, comprising:
    an airbag having a stored condition within the roof and being inflatable to a deployed condition extending into the cabin and aligned with the seat;
    a one-piece tether having a first end connected to a lower portion of the airbag and a second end connected to the roof; and
    tear stitching interconnecting overlying portions of the tether, the tear stitching being rupturable in response to occupant penetration into the deployed airbag to permit the interconnected overlying portions to move relative to one another such that the tether lengthens from a first length prior to occupant penetration to a second, longer length in response to occupant penetration, wherein the tear stitching is configured to rupture gradually in response to occupant penetration so that the lengthening of the tether due to rupturing of the tear seam is commensurate with the magnitude of forces exerted by the penetrating occupant so as to provide a gradual ride down for the penetrating occupant, and wherein the tether is connected to an upper portion of the airbag and wherein the lower portion of the airbag is configured to deploy into engagement with at least one of a lower torso and lap of the occupant so that the occupant fixes the lower portion of the airbag in place, allowing the tear stitching to rupture and the tether to unfurl in response to occupant penetration.

17. The system recited in claim 16 further comprising a second tether connected to the airbag and the vehicle and being free of tear stitching.

18. The system recited in claim 17, wherein the second tether is connected to the lower portion of the airbag and the roof.

19. The system recited in claim 16, wherein the tear stitching has an inverted U-shaped configuration.

20. The system recited in claim 16, wherein the tear stitching has an inverted V-shaped configuration.

21. The system recited in claim 16, wherein the upper portion of the airbag includes a neck having a folded condition when the tear stitching is intact and an unfurled condition when the tear stitching ruptures.

22. The system recited in claim 16, wherein the tear stitching is configured to provide a gradual slowdown of the penetrating occupant as the tether lengthens.

23. The system recited in claim 16, wherein the tear stitching comprises multiple segments configured to rupture individually to produce the lengthening of the tether.

24. The system recited in claim 16, wherein the tether is a first tether and wherein the system further comprises a second tether having a first portion connected to the roof and a second portion connected to a lower end of the lower portion of the airbag, wherein the second tether is configured to restrain the lower end of the lower portion of the airbag against the penetrating occupant while the lengthening of the first tether in response to rupture of the tear stitching allows the remainder of the lower portion to move in response to occupant penetration into the airbag.

* * * * *